United States Patent [19]

Sprunt

[11] Patent Number: 5,206,505
[45] Date of Patent: Apr. 27, 1993

[54] APPARATUS AND METHOD FOR RETRIEVING AND EVALUATING A SLIM HOLE DRILLED CORE SAMPLE OF A SUBSURFACE FORMATION

[75] Inventor: Eve S. Sprunt, Farmers Branch, Tex.

[73] Assignee: Mobil Oil Corporation, Fairfax, Va.

[21] Appl. No.: 824,928

[22] Filed: Jan. 23, 1992

[51] Int. Cl.$^5$ .................................... G01V 5/12
[52] U.S. Cl. ..................... 250/255; 250/254; 175/249
[58] Field of Search ............. 250/255, 254; 175/244, 175/249, 239

[56] References Cited

U.S. PATENT DOCUMENTS

| | | | |
|---|---|---|---|
| 1,857,693 | 5/1932 | Quintrell | 175/249 |
| 3,313,357 | 4/1967 | Venghiattis | 175/244 |
| 3,940,610 | 2/1976 | Dennis et al. | 250/253 |
| 3,986,555 | 10/1976 | Robertson | 175/249 |
| 4,180,727 | 12/1979 | Givens | 250/264 |

OTHER PUBLICATIONS

"Slim Hole Drilling-Conclusion", K. B. Gunn, Oil & Gas Journal, May 13, 1991, pp. 51-55.
"Slimhole Continuous Coring and Drilling in Tertiary Sediments", S. B. Randolph and A. P. Jourdan, SPE-/IADC Drilling Conf, Amsterdam, Mar. 11-14, 1991, Paper 21906.
"Mining Technique Finds Applications in Oil Exploration", E. P. Deliac, J. P. Messines & B. A. Thierree, Oil & Gas Journal, May 6, 1991, pp. 85-90.
"An Innovative Approach to Exploration and Exploitation Drilling: The Slim-Hole, High-Speed Drilling System", S. H. Walker and K. K. Millhelm, Journal of Petroleum Technology, Sep. 1990, pp. 1184-1191.

Primary Examiner—Carolyn E. Fields
Attorney, Agent, or Firm—Alexander J. McKillop; George W. Hager, Jr.

[57] ABSTRACT

A coring tool is lowered to the bottom of a wellbore through a subsurface formation. A coring bit at the lower end of the coring tool draws a core sample of the subsurface formation at the bottom of the wellbore into the coring tool. A coring barrel is positioned along the coring tool above and in juxtaposition with the coring bit. The core sample is drawn into a hollow cylindrical split member within the coring barrel, such member being split into two halves in an axial direction and comprised of a material effectively transparent to nuclear radiation. A wireline raises the split member containing the core sample upward through the coring tool to the surface of the earth. The core sample is tested for a nuclear radiation characteristic through the nuclear radiation transparent material of the split member at the well site. The split member is then reused to obtain a plurality of cores from the subsurface formation.

13 Claims, 2 Drawing Sheets

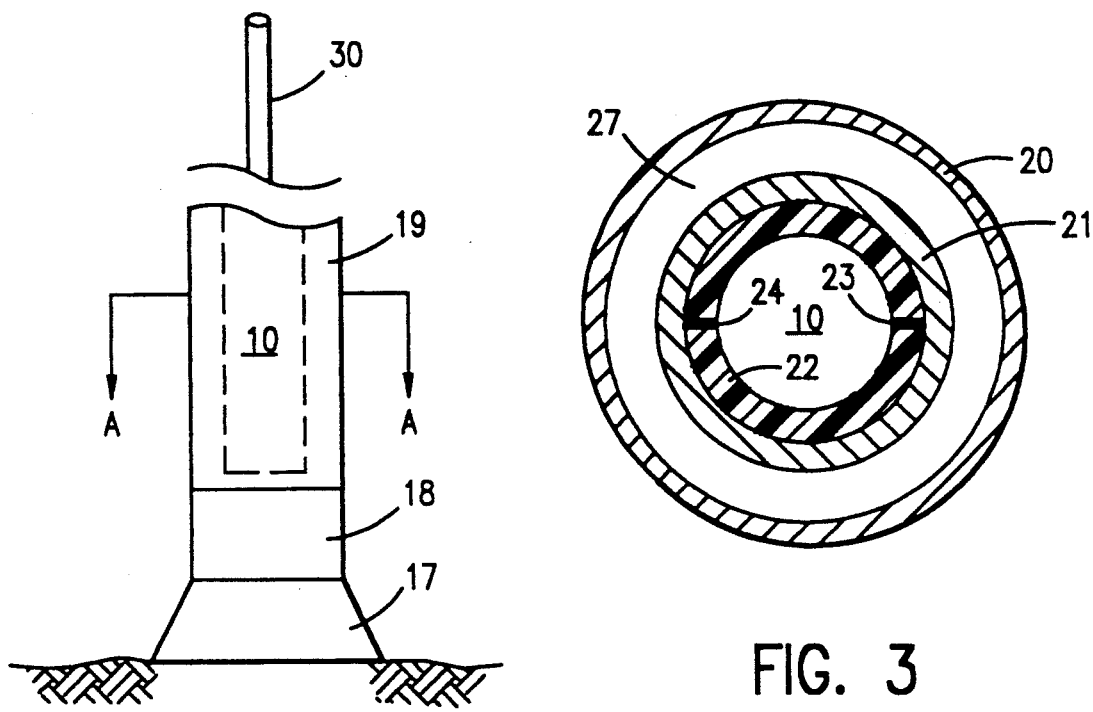
FIG. 2
FIG. 3
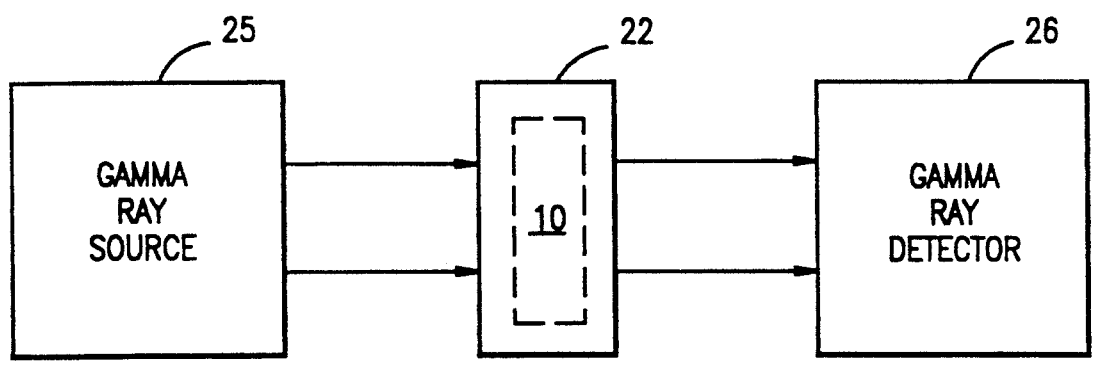
FIG. 4

APPARATUS AND METHOD FOR RETRIEVING AND EVALUATING A SLIM HOLE DRILLED CORE SAMPLE OF A SUBSURFACE FORMATION

BACKGROUND OF THE INVENTION

This invention relates to the bottom-hole coring of subsurface formations. Samples of earth material are taken from subsurface formations for various purposes. For example, samples are taken to obtain information concerning the chemical or physical characteristics of an earth material, such as permeability, porosity or fluid saturation. In the exploration for and production of oil and gas, samples of earth materials are taken ordinarily by means of a core drill and the samples obtained are in the form of cylinders or cores. Drilling muds with a water or oil base are commonly used as coring fluids. These drilling muds are normally formulated to provide desired density and rheological properties which make them particularly suitable for use in coring wells.

Slim hole drilling is receiving considerable attention as a method of reducing drilling costs in remote areas. It also has the advantage that a continuous core is retrieved. Such slim hole drilling is adequately described in (i) "Slim Hole Drilling—Conclusion" by K. B. Gunn, *Oil & Gas Journal*, May 13, 1991, pgs. 51–55, (ii) "Slimhole Continuous Coring and Drilling in Tertiary Sediments" by S. B. Randolph and A. P. Jourdan, SDE/IADC Drilling Conference, Amsterdam, Mar. 11–14, 1991, paper no. 21906, (iii) "Mining Technique Finds Applications in Oil Exploration" by E. P. Deliac, J. P. Messines and B. A. Thierree, Oil & Gas Journal, May 6, 1991, pages 85–90, and (iv) "An Innovative Approach To Exploration and Exploitation Drilling: The Slim-Hole High-Speed Drilling System" by S. H. Walker and K. K. Millhelm, *Journal of Petroleum Technology*, September 1990, pages 1184–1191.

The continuous coring system described in these articles allows recovery of the inner tube of the core barrel by using a wireline and without tripping the drillstring. The retrieved core sample is typically pumped out of the core barrel into a trough where it is cleaned, marked and geologically described. The core sample may then be subjected to on-site physical testing, such as the measurement of core gamma or core spectral gamma by a conventional gamma ray logging system, and then repackaged for shipment.

It is an object of the present invention to provide both a method and apparatus for more efficiently handling a slim hole drilled core sample so that the cost advantage of the slim hole drilling is not eliminated by the high cost of evaluating the core material once it is retrieved to the surface of the earth.

SUMMARY OF THE INVENTION

In accordance with the present invention there is provided apparatus and a method for obtaining a core sample from a subsurface formation below the bottom of a wellbore and for evaluating a nuclear radiation characteristic of the core sample at the well site.

More particularly, a coring tool containing a hollow cylindrical member split into two halves in an axial direction and comprised of a nuclear radiation transparent material is lowered to the bottom of a wellbore. A core sample of the subsurface formation at the bottom of the wellbore is drawn into the split member of the coring tool. The split member containing the core sample is retrieved to the surface of the earth. The core sample is measured for a nuclear radiation characteristic through the nuclear radiation transparent material of the split member at the well site.

In a further aspect, after nuclear radiation testing, the split member is separated into its two halves. The core sample may be further examined and then removed. The two halves of the split member are rejoined and the split member is repositioned in the coring tool at the bottom of the wellbore for receiving a new core sample for nuclear radiation testing when it is retrieved to the surface of the earth.

In a more specific aspect, a coring bit is located at the lower end of the coring tool for drawing the core sample into the coring tool. A coring barrel is positioned along the coring tool above the coring bit. The core sample is drawn through the coring bit into the coring barrel which comprises an outer tube and a split inner tube having an outside diameter less than the inside diameter of the outer tube to form an annulus between the inner and outer tubes for the flow of coring fluid through the coring bit from the surface of the earth. The inner tube is split into two halves in an axial direction. A split liner of a nuclear radiation transparent material is positioned within the inner tube for receiving the core sample as it is drawn into the coring barrel. The outer and inner tubes are of a stainless steel and the split liner is aluminum, fiberglass or plastic. The inner tube and split liner containing the core sample are retrieved by wireline to the surface of the earth. The inner tube is separated into its two halves and the split liner containing the core sample removed. Thereafter, the core sample is tested for a nuclear radiation characteristic at the well site while still contained within the split liner. Preferably the core sample is tested for its gamma or spectral gamma radiation characteristics.

BRIEF DESCRIPTION OF THE DRAWINGS

FIG. 2 is a pictorial view of a coring bit, a core catcher and core barrel as might be used in FIG. 1.

FIG. 3 is an enlarged cross-section view along lines A—A taken through the core barrel of FIG. 2.

FIG. 4 is the split liner of FIG. 3 containing a core sample being measured for core gamma or core spectral gamma.

DESCRIPTION OF THE PREFERRED EMBODIMENT

Figure 1:
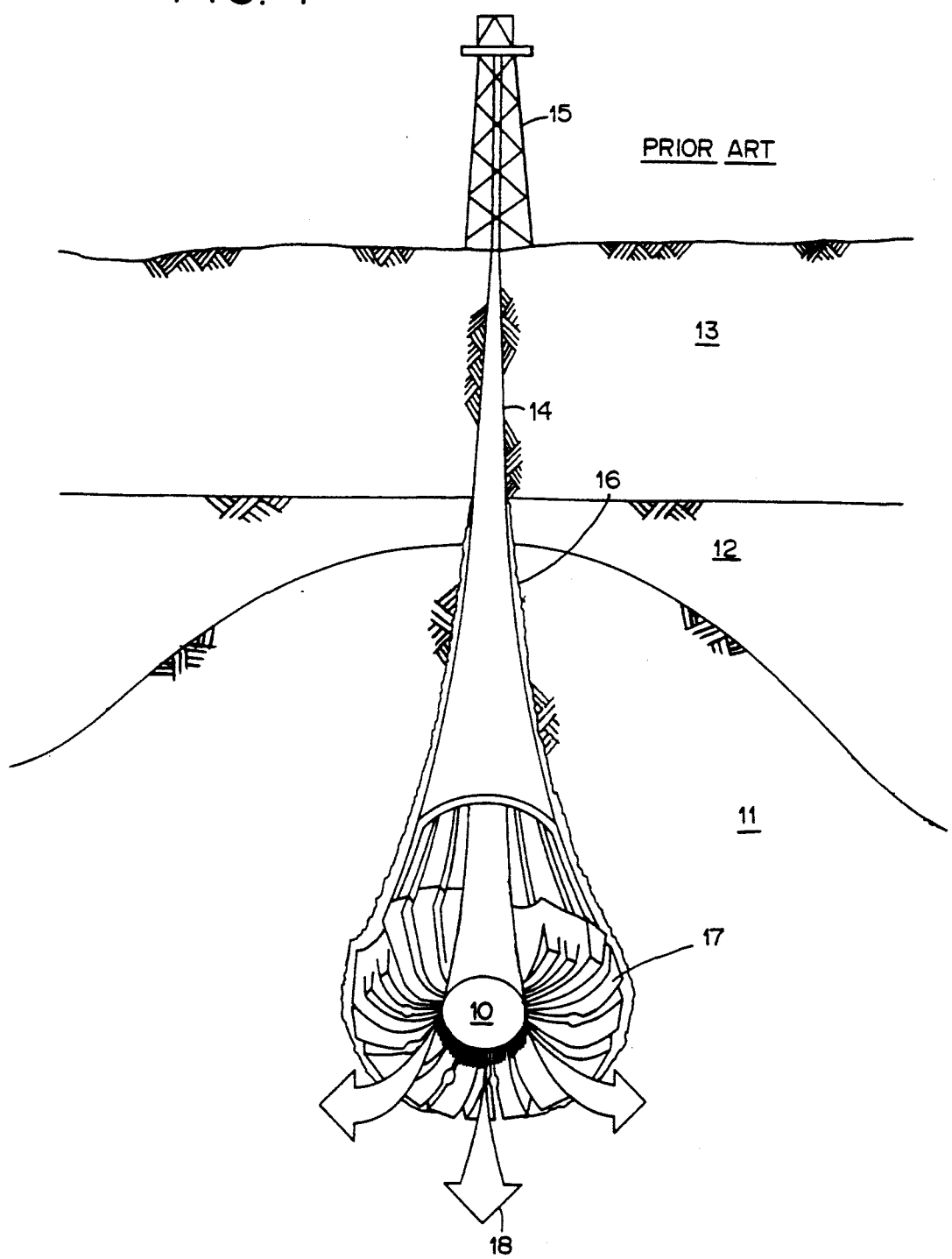
FIG. 1 illustrates in pictorial form a typical subsurface coring operation.

Referring not to FIG. 1, a typical coring tool of the prior art is shown in pictorial form obtaining a core sample 10 from a subsurface formation 11 underlying formations 12 and 13. Drill pipe 14 extends from a surface rig 15 through a wellbore 16 to the subsurface formation of interest 11. By drilling into the formation 11 with a coring bit 17, the solid core 10 of uncut formation enters the core barrel of the coring bit 17. A coring fluid flows out of coring bit 17 as shown by arrows 18 to penetrate the formation just in front of the coring bit and to aid in the drilling and drawing of the core sample into the coring bit and core barrel.

FIG. 2 depicts the core sample 10 in place inside the core barrel 19 after having been drawn, in by the coring action of coring bit 17 and core catcher 28. A cross-sectional view of the core barrel 19 containing the core sample 10 is shown in FIG. 3. Core barrel 19 comprises an outer tube 20 of stainless steel surrounding an inner tube 21 of stainless steel. An annulus 27 is formed between such inner tube 21 and outer tube 20. Inner tube 21 is typically stainless steel tube. Positioned inside inner tube 21 is a liner 22. Inner tube 21 is retrieved to the surface by way of wireline 30 shown in FIG. 2. Unconsolidated core is usually obtained using a disposable liner of glass fibers known under the trademark "Fiberglas", aluminum or plastic. The disposable liner is 3- to 5-foot sections at the well site and the individual 3- to 5-foot sections are transported to a laboratory for testing, where the core is removed from the liner by cutting the liner in half length-wise. With such disposable liners, on-site core handling and evaluation is substantially increased because the core would have to be cut out of the liner before the core could be analyzed, and the liner could not be reused.

It is a specific feature of the present invention to provide for a new and improved liner 22 which not only enhances recovery but enhances on-site core handling and evaluation. Referring again to FIG. 3, liner 22 is split axially as shown at 23 and 24 and comprises a material that is effectively transparent to nuclear radiation such as aluminum, plastic or glass fibers known under the trademark "Fiberglas". By employing such split liner 22, the core 10 can be run through a conventional core gamma or core gamma spectral system as depicted in FIG. 4 showing a gamma ray source 25 irradiating the core containing liner 22 and the gamma ray detector 26 receiving scattered gamma rays from the core 10.

A gamma ray logging system is described in U.S. Pat. No. 4,180,727 to Givens and a spectral gamma ray logging system is described in U.S. Pat. No. 3,940,610 to Dennis et al., the teachings of which are incorporated herein by reference. Since the core gamma or core spectral instruments can be on-site, the liner 22 would not have to be cut down to convenient lengths for shipping, but could be run through the instrument in full length. This minimizes the disruption of the core. Thereafter, the core 10 can be exposed by opening the split liner 22 rather than pumping the material out of the liner. The core can then be photographed and sampled while still in half of the split liner. After completion of on-site core analysis, the core can be removed from the liner for disposal and the split liner is then available to retrieve another core during a subsequent coring operation. If the core material were of sufficient interest to justify shipment of the full core to another location, the core could be frozen before being removed from the split liner, or before the split liner is opened.

Having now described the present invention in conjunction with a preferred embodiment, it is to be understood that various modifications and changes may be made without departing from the spirit and scope of the invention as set forth in the appended claims.

I claim:

1. Apparatus for obtaining and evaluating a core sample from a subsurface formation below the bottom of a wellbore at a well site, comprising
   a) a coring tool for positioning at the bottom of a wellbore through a subsurface formation,
   b) a coring bit at the lower end of said coring tool for drawing a core sample of the subsurface formation at the bottom of the wellbore into said coring tool,
   c) a coring barrel positioned along said coring tool above said coring bit,
   d) a hollow cylindrical split member within said coring barrel into which said core sample is drawn during subsurface coring, said member being split into two halves in an axial direction and comprised of a material effectively transparent to nuclear radiation, and
   e) means for raising said split member containing said core sample upward within said coring tool to the surface of the earth, and
   f) means for measuring a nuclear radiation characteristic of said core sample through the effectively nuclear radiation transparent material of said split member at the well site.

2. The apparatus of claim 1 wherein said split member is comprised of a material effectively transparent to gamma rays.

3. The apparatus of claim 1 wherein said split member is comprised of aluminum.

4. The apparatus of claim 1 wherein said split member is comprised of glass fibers.

5. The apparatus of claim 1 wherein said split member is comprised of plastic.

6. The apparatus of claim 1 wherein said coring barrel comprising:
   a) an outer tube, and
   b) an inner tube having an outside diameter that is less than the inside diameter of said outer tube to form an annulus between said inner and outer tubes for the flow of coring fluid through the coring bit from the surface of the earth; and
   c) said split member of material effectively transparent to radiation is a liner positioned within the inner tube.

7. The apparatus of claim 6 wherein said means for raising said split member is a wireline which raises said inner tube with said split member positioned within said inner tube.

8. The apparatus of claim 6 wherein said inner tube is comprised of stainless steel and said split member is comprised of aluminum.

9. The apparatus of claim 6 wherein said inner tube is comprised of stainless steel and said split member is comprised of glass fibers.

10. The apparatus of claim 6 wherein said inner tube is comprised of stainless steel and said split member is comprised of plastic.

11. A method for measuring a nuclear radiation characteristic of a core sample from a subsurface formation, comprising the steps of:
    a) lowering a coring tool containing a hollow cylindrical member split into two halves in an axial direction and comprised of an effectively nuclear radiation transparent material to the bottom of a wellbore,
    b) drawing a core sample of the subsurface formation at the bottom of the wellbore into said split member of said coring tool,
    c) retrieving said split member containing said core sample from the wellbore,
    d) irradiating said core sample through the nuclear radiation transparent material of said split member with nuclear radiation, and
    e) detecting nuclear radiation reradiating from said core sample through the nuclear radiation transparent material of said split member.

12. The method of claim 11 further comprising the steps of:
    a) separating said split member and removing said core sample,
    b) rejoining the two halves of said split member, c) repositioning said split member in said coring tool at the bottom of said wellbore, and d) repeating steps (b) through (e) for the obtaining and nuclear radiation testing of a plurality of core samples from said subsurface formation.

13. The method of claim 11 wherein said core sample is radiated with gamma rays and scattered gamma rays are detected as they reradiate from said core sample.

* * * * *